United States Patent [19] [11] 4,434,506
Fujiwara et al. [45] Feb. 28, 1984

[54] CIRCUIT ARRANGEMENT FOR PROTECTING A CONTROL CHANNEL FROM JAMMING WAVES IN A RADIO COMMUNICATION SYSTEM

[75] Inventors: Ryuhei Fujiwara; Tomokazu Kai; Hidetoshi Nakahara, all of Tokyo, Japan

[73] Assignee: Nippon Electric Co., Ltd., Tokyo, Japan

[21] Appl. No.: 332,775

[22] Filed: Dec. 21, 1981

[30] Foreign Application Priority Data

Dec. 23, 1980 [JP] Japan .................................. 55-181366
Dec. 23, 1980 [JP] Japan .................................. 55-181367

[51] Int. Cl.³ .......................... H04B 1/00; H04B 7/00
[52] U.S. Cl. ........................................ 455/53; 455/33; 455/56; 455/67; 179/2 EB
[58] Field of Search ...................... 455/33, 34, 53, 54, 455/56, 58, 62, 67; 179/2 EB; 340/825.54

[56] References Cited

U.S. PATENT DOCUMENTS 4,096,440  6/1978  Okasaka ................................ 455/56
4,145,657  3/1979  Hanni .............................. 179/2 EB
4,352,955  10/1982 Kai et al. ......................... 179/2 EB Primary Examiner—Jin F. Ng
Attorney, Agent, or Firm—Sughrue, Mion, Zinn, Macpeak & Seas

[57] ABSTRACT

In a circuit arrangement of a control station in a radio communication system comprising a plurality of substations, such as a land mobile telephone system, a measuring circuit measures an intensity of electric field in an up control channel to the control station during each quiescent period of signals in the up channel to detect jamming waves. Each quiescent period preferably appears in the up control channel in response to selected control signals of a down control channel to the substations. On detection of the jamming waves, the control channel is switched to a preselected one of speech channels between the control station and substations by switching circuits to use the preselected speech channel as a new control channel.

4 Claims, 5 Drawing Figures

CIRCUIT ARRANGEMENT FOR PROTECTING A CONTROL CHANNEL FROM JAMMING WAVES IN A RADIO COMMUNICATION SYSTEM

BACKGROUND OF THE INVENTION

This invention relates to a circuit arrangement for use in a control station of a radio communication system and, in particular, to a circuit arrangement for a control station of a land mobile telephone system.

As will later be described with reference to one of several figures of the accompanying drawing, a land mobile telephone system generally comprises a control station comprising, in turn, an exchange and a plurality of base stations, each having a radio or service zone. The base stations are fixedly located at geographically different sites so that the respective service zones may cover a service area. Alternatively, each of the service zones may be geographically independent of the others. A plurality of land mobiles, namely, automobiles may be present in a service zone of a base station accompanied by the exchange. The automobiles thus serve as substations comprised by the land mobile telephone system. Some of the substations are communicable with the other subscribers through the base station under consideration. The substations are also communicable with other substations in another service zone through the control station. Depending on the circumstances, no substation may be present in the service area.

A plurality of speech channels and a few control channels are allotted to each zone. The control channel comprises a paging channel for selectively calling up automobiles in the service zones. The paging channel is common to a plurality of the service zones. Therefore, the whole of the system is adversely affected when the paging channel is locally interrupted or suspended by any jamming or interfering waves.

This means that occurrence of jamming waves should be monitored and detected to favorably operate the control system without any interruption.

In order to detect the jamming waves, a conventional system has measured an intensity of electric field during an idle or unused period, such as at night or the like, of the system. However, it is impossible for this conventional system to find out temporary jamming waves and to rapidly recover the system from interruption.

In another conventional control system, the intensity of electric field of a test signal is periodically measured during operation of the system. With this system, communication should, however, be periodically interrupted intermittently for the purpose of measuring the field intensity.

In both of the conventional systems, no automobile is communicable with a base station in the service area on occurrence of jamming waves for a long time.

SUMMARY OF THE INVENTION

It is an object of this invention to provide a circuit arrangement for use in a control station of a radio communication system, wherein jamming waves can be always monitored without interruption of communication.

It is another object of this invention to provide a circuit arrangement of the type described, which is operable even when a control channel is suspended by jamming waves.

A circuit arrangement to which this invention is applicable is for use in a control station of a radio communication system comprising a plurality of substations each of which is communicable with the control station through radio channels comprising a control channel and a plurality of speech channels. The control channel comprises a down and an up control channel. The down control channel is for supplying the substations with a set of control signals produced in the control station and comprising first and second control signals among which the second control signals are for requesting the substations not to answer the second control signals. The first control signals are for requesting selected ones of the substations to produce answer signals with time intervals left between the answer signals. The up control channel is for successively transmitting the answer signals to the control station from the selected substations. According to this invention, a circuit arrangement comprises defining means for defining each time interval between two adjacent answer signals to produce a gate pulse lasting during a first predetermined period when the each time interval is not shorter than the first predetermined period and measuring means coupled to the defining means and the second control channel for measuring the intensity of electric field of the answer signals transmitted through said up control channel during the first predetermined period to detect occurrence of the jamming waves in the up control channel.

BRIEF DESCRIPTION OF THE DRAWING

FIG. 1, is a time chart for describing operation of the circuit arrangement illustrated in FIG. 2;

DESCRIPTION OF THE PREFERRED EMBODIMENTS

Figure 1:
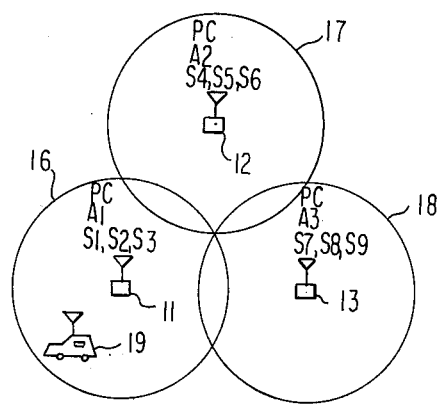
FIG. 1 schematically shows a plurality of service zones of a land mobile telephone system to which this invention is applicable.

Referring to FIG. 1, a land mobile telephone control system to which this invention is applicable will be described at first for a better understanding of this invention. The illustrated system comprises first, second, and third base stations 11, 12, and 13 each of which is geographically separated from the others. The first, second, and the third base stations 11, 12, and 13 have first, second, and third service zones 16, 17, and 18, respectively, which cover a service area. The first through third base stations 11, 12, and 13 are connected to a control station including an exchange (not shown in this figure). A combination of the base stations and the exchange is called a control station in the instant specification.

The system comprises a plurality of substations, namely, automobiles 19 (typically depicted as a single automobile) each of which is communicable with the base stations 11, 12, and 13 through radio channels comprising control channels and a plurality of speech channels. As control channels, provision is made of paging and access channels, as will later be described. More particularly, the illustrated first, the second, and the third base stations are provided with the speech channels depicted at $S_1$, $S_2$, $S_3$; $S_4$, $S_5$, $S_6$; and $S_7$, $S_8$, $S_9$, respectively, and with the access channels depicted at $A_1$, $A_2$, and $A_3$, respectively. The paging channel depicted at PC is common to all service zones. At any rate, a pair of the paging and the access channels are allotted as a control channel to each of the base stations 11, 12, and 13 in addition to a plurality of speech channels. For brevity of description, it will be assumed that the automobiles 19 in question are running in the first service zone 16 and is directly communicable with the first base station 11. Consideration is, therefore, mainly made on the automobiles 19 in the first service zone 16 by way of example. Similar consideration is also possible on any other automobiles in the remaining service zones.

Let the automobiles 19 in the first service zone 11 be selectively called up from the first base station 11. In this case, the paging channel PC is used as the control channel. The paging channel PC comprises a down paging channel directed from the base station 11 to the automobiles 19 and an up paging channel directed from the automobiles 19 to the base station 11. The down paging channel is used to supply the automobiles 19 with a set of control signals produced in the control station. The control signals are classified into first control signals for requesting the automobiles 19 to produce answer signals and second control signals for requesting the automobiles 19 not to produce the answer signals, as will become clear as the description proceeds. The up paging channel is for transmitting the answer signal to the first base station 11 from each of the automobiles at which the answer signals are produced. It should be noted here that the answer signals are successively received by the first base station 11 with time intervals left between the answer signals.

In order to selectively call up the automobiles 19 in the first service zone 16, paging signals are broadcast as a part of the first control signals through the down paging channel from the first base station 11 and also from the second and the third base stations 12 and 13 because some or all of the automobiles 19 may move to the second and/or the third service zones. Responsive to the paging signals, the called automobiles 19 return the answer signals back to the base station 11 through the up paging channel. Supplied with the answer signals through the up paging channel, the control station produces channel assignment signals indicative of speech channels to be utilized by the automobiles 19 and loop check signals indicative of information necessary to confirm connection of the automobiles 19 to the first base station 11. The channel assignment and the loop check signals are delivered to the automobiles 19 through the down paging channel. No answer signal is produced from the automobiles 19 in response to the channel assignment and the loop check signals. Thus, the channel assignment and the loop check signals serve as the second control signals.

Let a call originate with one of the automobiles 19. In this case, the automobiles 19 produce identification code signals indicative of identification numbers for specifying called subscribers. The access channel is used to transmit the identification code signals and hence as the control channel in the case of call origination from the automobiles 19. Although various control operations are carried out by the use of the access channel, it may be understood throughout the instant specification that the access channel comprises an up access channel and a down access channel, like the paging channel.

It is to be noted here that the control channel including the paging channel and the access channel is common to a plurality of the automobiles 19. Therefore, the whole system is adversely affected by interruption of the control channel, as pointed out in the preamble of the instant specification.

Figure 2:
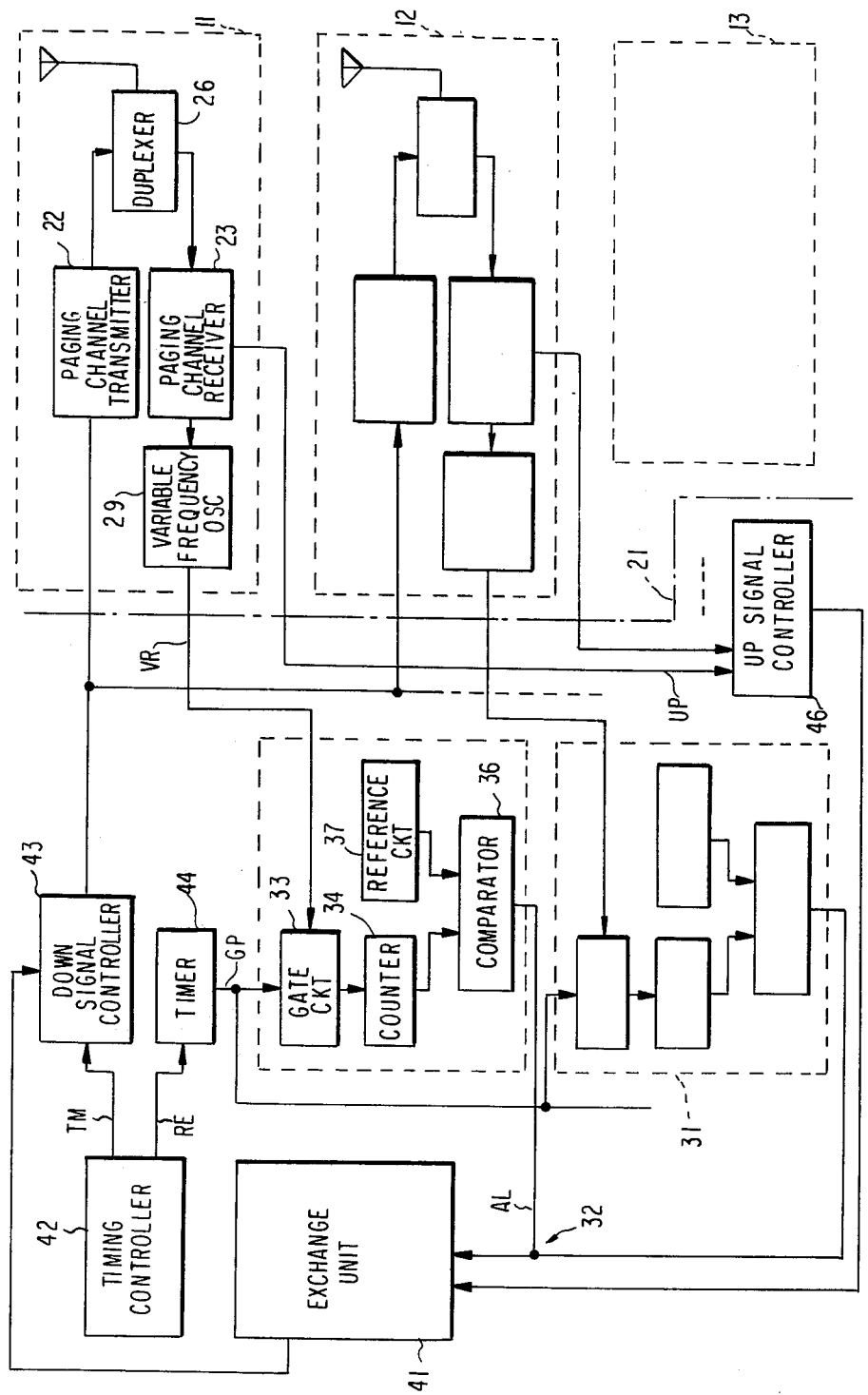
FIG. 2 shows a schematic block diagram of a circuit arrangement according to a first embodiment of this invention.

Referring to FIG. 2, a circuit arrangement according to a first embodiment of this invention is used in a control station comprising three of the base stations 11, 12, and 13 and a single exchange 21. In FIG. 2, each of the base stations 11, 12, and 13 comprises a paging channel transmitter 22 and a paging channel receiver 23, both of which are coupled to the paging channel PC illustrated in FIG. 1. More particularly, the transmitter 22 and the receiver 23 are operable in the down paging channel and the up paging channel, respectively, together with a duplexer 26 and an antenna 27. The paging channel receiver 23 comprises a limiter (not shown) for providing a limiter voltage dependent on an intensity of electric field in the up paging channel. The limiter is connected in a usual manner to a high frequency amplifier or an intermediate frequency amplifier (not shown) in the receiver 23.

The circuit arrangement comprises a variable frequency oscillator 29 in each of the first through third base stations 11 through 13. The variable frequency oscillator 29 is connected to the limiter included in the control channel receiver 23 in order to produce a variable signal VR having a frequency variable with the limiter voltage. The variable signal VR is therefore variable in periods.

The exchange 21 further comprises a first portion 31 for the respective base stations, such as 11 and 12, and a second portion 32 common thereto.

Each of the first portions 31 comprises a gate circuit 33 for gating the variable signal VR in a manner to be described later, a counter 34 for counting a variable number of periods of the variable signal VR in unit time, and a comparator 36 for comparing the count with a reference value given by a reference circuit 37.

The second portion 32 comprises an exchange unit 41 comprising, in turn, speech path equipment and common control equipment both of which are well known in the art and not depicted. In addition to the exchange unit 41, the second portion 32 comprises a timing controller 42 for producing a sequence of timing pulses TM in a predetermined order, a down signal controller 43 for controlling the first and the second control signals in accordance with a program to send the same to the down paging channel, and a timer 44 operable in a manner to be described later. Further, an up signal controller 46 is connected between the respective paging channel receivers 23 and the exchange unit 41 so as to control the answer signals supplied through the down paging channel.

Figure 3:
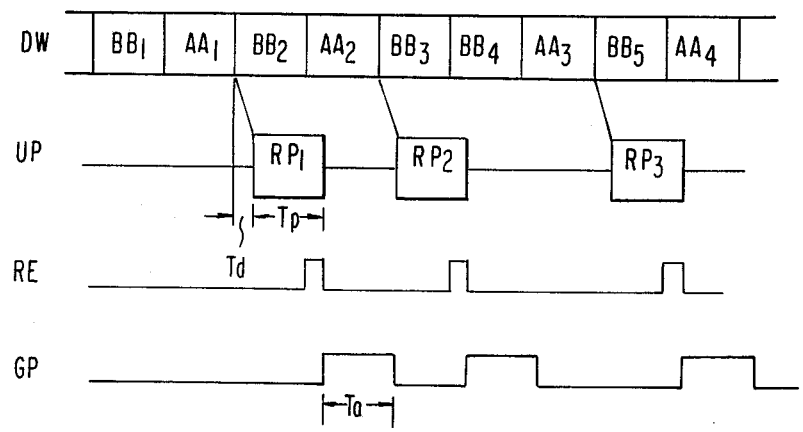
FIG. 3, drawn below

Referring to FIG. 2 again and FIG. 3 anew, the exchange unit 41 produces the first and the second control signals (depicted at $AA_1$, $AA_2$, . . . ; and $BB_1$, $BB_2$, . . . , respectively) in a usual manner. The down signal controller 43 controls the first and the second control to form a down control signal sequence DW in which the first and the second control signals are included in an order determined by the program.

The down control signal sequence DW is supplied from the down signal controller 43 under control of the timing controller 42 in a manner shown in FIG. 3.

More specifically, the down control signal sequence DW includes at least one of the second control signals $BB_1$, $BB_2$, ... interposed between two adjacent ones of the first control signals $AA_1$, $AA_2$, ....

Responsive to the down control signal sequence DW, the automobiles produce, through the up paging channel, an up control signal sequence (depicted at UP) including the answer signals depicted at $RP_1$, $RP_2$, .... It should be recollected that the first control signals $AA_1$, $AA_2$, ... request the automobiles 19 to produce the answer signals $RP_1$, $RP_2$, ... and that the second control signals $BB_1$, $BB_2$, ... request the automobiles not to produce the answer signals. Accordingly, the answer signals $RP_1$, $RP_2$, ... are produced in synchronism with the respective first control signals $AA_1$, $AA_2$, .... As shown in FIG. 3, quiescent periods of signals are left between two adjacent ones of the answer signals $RP_1$, $RP_2$, ... and are called time intervals. Each of the time intervals is selected so that it is equal to or longer than a first perdetermined period $T_a$ as will later be described. Briefly, each time interval is intentionally produced in the up paging channel UP by the use of the timing controller 42, as will become clear as the description proceeds.

Each of the answer signals $RP_1$, $RP_2$, ... is received by the base stations a delay period $T_d$ after extinction of the corresponding first control signal and lasts during a prescribed period $T_p$ following the delay period $T_d$. The total period defined by the delay period $T_d$ and the prescribed period $T_p$ is called a second predetermined period. Accordingly, it may be said that each of the answer signals is received within the second predetermined period. Inasmuch as both of the delay period $T_d$ and the prescribed period $T_p$ can be previously determined in the service area, the second predetermined period may be invariable despite the distance between the base stations and the automobiles.

Under these circumstances, the timing controller 42 supplies the timer 44 with a reset pulse RE during reception of each of the answer signals $RP_1$, $RP_2$, ..., as shown in FIG. 3. The reset pulse RE disappears in synchronism with extinction of each answer signal. Supply of such a reset pulse RE is possible by monitoring the second predetermined period following each of the just control signals.

Responsive to the reset pulse RE, the timer 44 is released to produce a gate pulse GP lasting during the first predetermined period $T_a$.

In the illustrated circuit arrangement, each time interval between two adjacent ones of the answer signals is determined in advance so that it is not shorter than the first predetermined period $T_a$. In addition, the timing controller 42 monitors each of the answer signals. As a result, it may be said that the timing controller 42 serves to specify or define each time interval. Thus, a combination of the timing controller 42 and the timer 44 is operable to define each time interval and to produce the gate pulse GP when each time interval is not shorter than the first predetermined period $T_a$.

Further referring to FIG. 2, the gate circuit 33 is supplied with the gate pulse GP to be opened during the presence of the gate pulse GP, namely, first predetermined period $T_a$ which serves as unit time. As a result, the gate circuit 33 gates, during the first predetermined period $T_a$, the variable signal VR having a variable number of periods. The counter 34 counts the variable number of periods during the first predetermined period to produce a count signal representative of a count. Responsive to the count signal and the reference signal supplied from the reference circuit 37, the comparator 36 produces an alarm signal AL representative of occurrence of jamming waves when the count exceeds the reference value. The alarm signal AL is sent from the comparator 36 to the exchange unit 41.

As mentioned above, a combination of the counter 34, the comparator 36, and the reference circuit 37 serves to measure the intensity of electric field during the first predetermined period $T_a$ to detect occurrence of the jamming waves.

Thus, the circuit arrangement measures the intensity of electric field on production of each down paging signal to detect whether or not the jamming waves are present in the paging channel. Timely or rapid procedure for restoration of the system is possible on occurrence of the jamming waves and enables the system to be prevented from any confusion resulting from a long-term interruption of the control channel.

An additional control signal may be transmitted from the base stations 11 through 13 to the automobiles 19 to forcibly stop each answer signal $RP_1$, $RP_2$, .... The additional control signal may be sent through either one of the paging and the access channels and serves to provide each time interval not shorter than the first predetermined period $T_a$.

Figure 4:
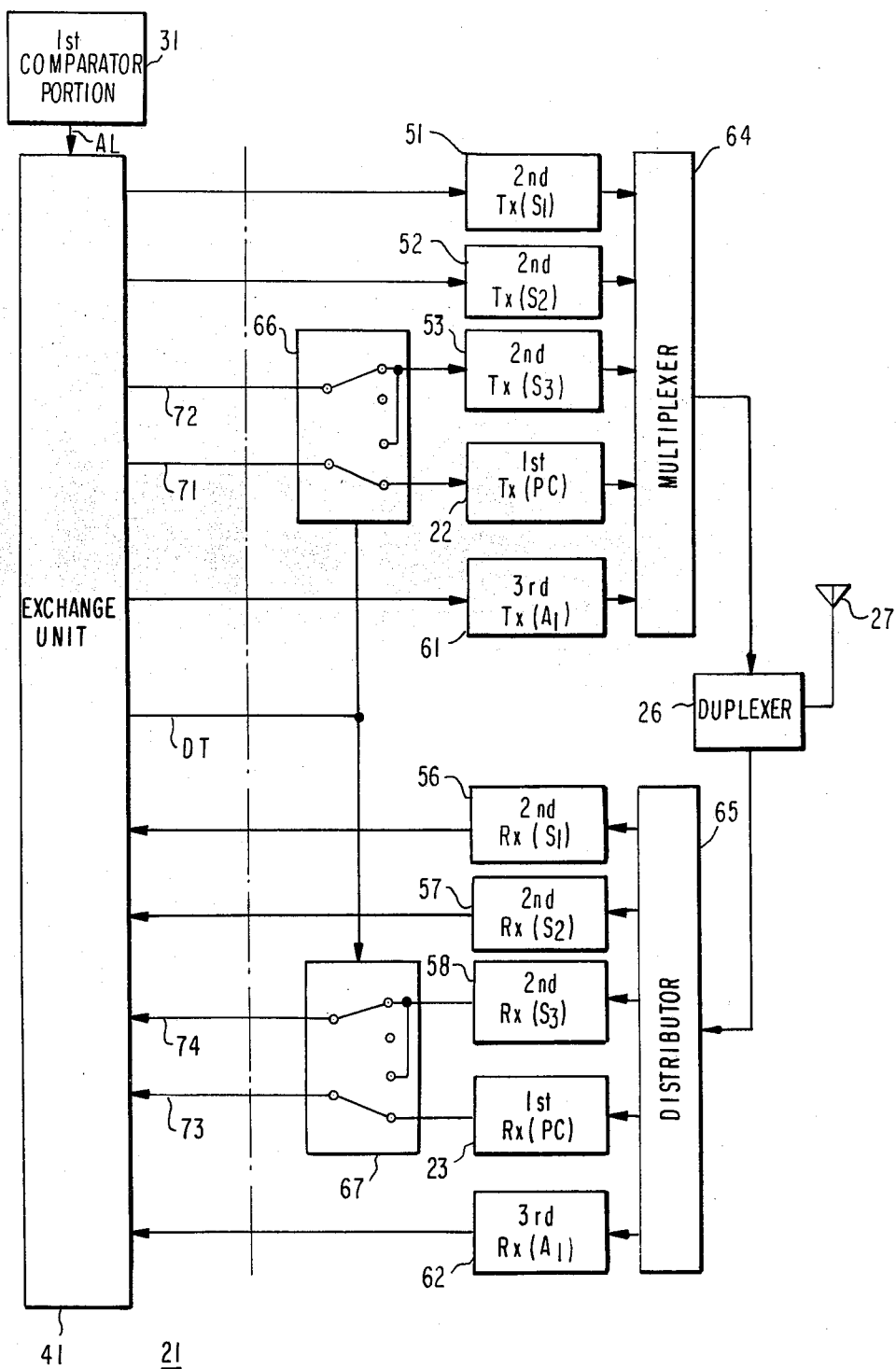
FIG. 4 is a schematic block diagram of a circuit arrangement according to a second embodiment of this invention.

Referring to FIG. 4, a circuit arrangement according to a second embodiment of this invention is for use in combination with the circuit arrangement illustrated with reference to FIGS. 2 and 3. In FIG. 4, the first base station 11 alone is depicted merely for simplicity of illustration. The exchange 21 is represented by an exchange unit 41 and a first portion 31 both of which are similar to those illustrated in FIG. 2. It may be understood for the time being that the exchange unit 41 produces a detection signal DT in response to the alarm signal AL supplied from the comparator 36 illustrated in FIG. 2.

As described with reference to FIG. 1, consideration is made of three of the speech channels $S_1$, $S_2$, and $S_3$ and the access channel $A_1$ in addition to the paging channel PC. Each of the speech channels $S_1$, $S_2$, and $S_3$ comprises a down and an up speech channel for transmitting and receiving speech signals representative of speeches to and from the substations or automobiles, respectively.

As is the case with the system illustrated in FIG. 2, the first base station 11 comprises a paging channel transmitter 22, a paging channel receiver 23, a duplexer 26, and an antenna 27. The paging channel transmitter 22 is for transmitting the first and the second control signals AA and BB (suffixes omitted) to the automobiles 19 through the down paging channel. The paging channel receiver 23 is for receiving the answer signals RP from the automobiles through the up paging channel. For convenience of description, the paging channel transmitter and receiver 22 and 23 will be called a first transmitter and a first receiver hereinafter.

Furthermore, the first base station 11 comprises three of second transmitters 51, 52, and 53 for transmitting the speech signals to the automobiles through the down speech channels $S_1$, $S_2$, and $S_3$, respectively, and three of second receivers 56, 57, and 58 for receiving the speech signals from the automobiles through the up speech channels designated by similar symbols $S_1$, $S_2$, and S3, respectively. Incidentally, a down access channel or third transmitter 61 and an up access channel or third receiver 62 are shown in FIG. 4. A transmitter multiplexer 64 is interposed between the duplexer 26 and the respective transmitters 22, 51–53, and 61 while a distributor 65, between the duplexer 26 and the respective receivers 23, 56–58, and 62.

Now, the circuit arrangement comprises a first switching circuit 66 and a second switching circuit 67, both being responsive to the detection signal DT. The first switching circuit 66 is coupled to the first transmitter 22 and a selected one 53 of the second transmitters 51 through 53. Likewise, the second switching circuit 67 is coupled to the first receiver 23 and a selected one 58 of the second receivers corresponding to the selected transmitter 53. In FIG. 4, the selected transmitter 53 and the selected receiver 58 are operable in a selected one $S_3$ of the speech channels and are, therefore, related to each other in operation.

During absence of the detection signal DT, the first switching circuit 66 connects the first and the selected transmitters 22 and 53 to the exchange unit 41 through a paging channel output line 71 and a speech channel output line 72, respectively, while the second switching circuit 67 connects the first and the selected receivers 23 and 58 to the exchange unit 41 through a paging channel input line 73 and a speech channel input line 74, respectively. Responsive to the detection signal DT, the first and the second switching circuits 66 and 67 are simultaneously operated to switch the first transmitter 22 and the first receiver 23 to the selected transmitter 53 and the selected receiver 58, respectively. As a result, the paging channel output line 71 and the paging channel input line 73 are connected to the selected transmitter 53 and receiver 58, respectively. The first transmitter 22 and the first receiver 23 are both isolated from the exchange unit 41 as well as the speech channel output line 72 and the speech channel input line 74.

Therefore, the first and the second control signals are transmitted from the selected transmitter 53 to the automobiles through the selected down speech channel $S_3$. On the other hand, the answer signals are received by the selected receiver 58 through the selected up speech channel $S_3$. This shows that the selected speech channel $S_3$ is used as a new paging channel.

Figure 5:
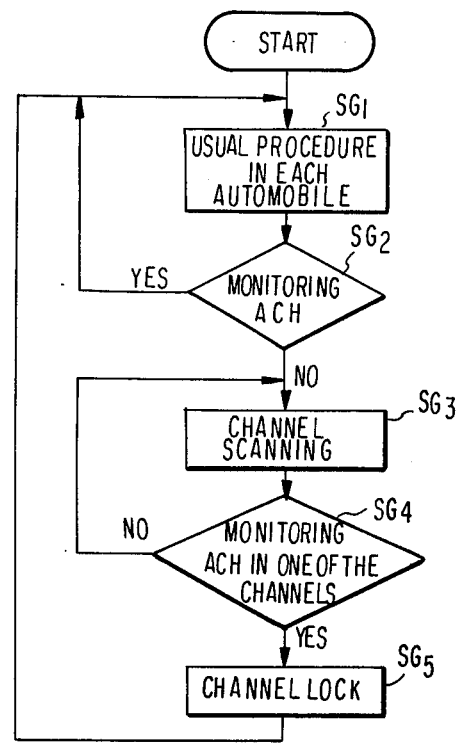
FIG. 5, depicted on the right side of FIG. 1, shows a flow chart for describing operation of an automobile cooperating with the circuit arrangement illustrated in FIG. 4.

Referring to FIG. 5, description will be made of operation of each automobile for use in combination with the land mobile telephone system illustrated with reference to FIG. 4. Inasmuch as the paging channel PC is switched to the third speech channel $S_3$, as described in conjunction with FIG. 4, each automobile should search for the third speech channel $S_3$ newly used as a paging channel.

Accordingly, search operation for the third speech channel $S_3$ will be mainly described hereinafter. It is to be mentioned here that a paging channel, as a rule, broadcasts access channel (abbreviated to ACH) information which relates to an access channel and which is indicative of a directory number, namely, a code of the access channel.

The operation is started by carrying out the usual procedure necessary in each automobile, as shown by a first stage $SG_1$. The first stage $SG_1$ is followed by a second stage $SG_2$ in which the ACH information in the paging channel is monitored for a prescribed period. If the ACH information lasts the prescribed period, the first stage $SG_1$ is carried out again after the second stage $SG_2$. Otherwise, a third stage $SG_3$ follows the second stage $SG_2$ to search for a new paging channel, namely, third speech channel $S_3$. The third stage $SG_3$ is carried out by scanning one of the channels. In order to search for the third speech channel $S_3$, it is monitored whether or not ACH information is received during a period of, for example, 60 seconds through the channel in question, as shown by a fourth stage $SG_4$. When the reception is unsuccessful, operation is returned back to the third stage $SG_3$. Otherwise, the channel scan is stopped to lock the channel in question, as shown by a fifth stage $SG_5$. In this stage $SG_5$, the number or code of the third speech channel $S_3$ is kept in each automobile as a new paging channel.

Thereafter, the third speech channel $S_3$ is used as the new paging channel in each automobile running within the first service zone 16 illustrated in FIG. 1.

With the system illustrated in FIG. 4, it is possible to avoid trouble resulting from interruption of the paging channel, by shifting the paging channel to one of the speech channels. Therefore, degradation of service is avoidable in the telephone control system.

While this invention has thus far been described in conjunction with a few embodiments thereof, it is readily possible for those skilled in the art to practice this invention in various manners. For example, the substations may not be automobiles but ships or fixed subscribers. The jamming waves may be monitored and measured in the access channel, instead of the paging channel. In FIGS. 2 and 3, each time interval between two adjacent ones of the answer signals may be directly monitored in each base station to measure the first predetermined period $T_a$.

What is claimed is:

1. A circuit arrangement for use in a control station of a radio communication system comprising a plurality of substations each of which is communicable with said control station through radio channels comprising a control channel and a plurality of speech channels, said control channel comprising a down and an up control channel, said down channel being for supplying said substations with a set of control signals produced in said control station and comprising first and second control signals among which said second control signals are for requesting said substations not to answer said second control signals, said first control signals being for requesting selected ones of said substations to produce answer signals with time intervals left between said answer signals, said up control channel being for successively transmitting the answer signals to said control station from said selected substations, said circuit arrangement comprising:

defining means for defining each time interval between two adjacent answer signals to produce a gate pulse lasting during a first predetermined period when said each time interval is not shoter than said first predetermined period; and measuring means coupled to said defining means and said second control channel for measuring the intensity of electric field of said up control channel during said first predetermined period to detect occurrence of jamming waves in said up control channel.

2. A circuit arrangement as claimed in claim 1, at least one of said second control signals being arranged between two adjacent ones of said first control signals, each of the answer signals being to be received by said base station within a second predetermined period after extinction of each of said first control signals with said each time interval not shorter than said first predetermined period, wherein said defining means comprises:

timing control means for producing a sequence of timing pulses to define production of said first and said second control signals and reception of the answer signals and to provide said first predetermined period after said second predetermined period lapses; and timer means responsive to said timing pulse for producing said gate pulse during said first predetermined period following said second predetermined period.

3. A circuit arrangement as claimed in claims 1 or 2, wherein said measuring means comprises:

signal generating means coupled to said up control channel for generating a variable signal having periods variable with said intensity of electric field;

gate means coupled to said generating means and said timer means for gating the variable signal during the presence of said gate pulse;

counting means coupled to said gate means for counting a variable number of said periods in the variable signal received from said gate means to produce a count signal representative of a count of said counting means;

reference means for producing a reference signal representative of a reference value; and alarm producing means responsive to said count signal and said reference signal for producing an alarm signal representative of occurrence of said jamming waves when said count exceeds said reference value.

4. A circuit arrangement as claimed in claim 1, said speech channels comprising down and up speech channels for transmitting and receiving speech signals representative of speeches to and from the substations, respectively, said circuit arrangement comprising first transmitting means for transmitting said first and said second control signals to the substations through said down control channel, first receiving means for receiving the answer signals from the substations through said up control channel, a plurality of second transmitting means for transmitting the speech signals to the substations through said down speech channels, and a plurality of second receiving means for receiving the speech signals from the substations through said up speech channels, said circuit arrangement further comprising:

means coupled to said measuring means for producing a detection signal when said jamming waves are measured by said measuring means;

first means responsive to said detection signal and coupled to said first transmitting means and a prescribed one of said second transmitting means for switching said first transmitting means to said prescribed one of said second transmitting means to transmit said first and said second control signals to the substations through said prescribed one of said second transmitting means; and second means responsive to said detection signal and coupled to said first receiving means and a prescribed one of said second receiving means for switching said first receiving means to said prescribed one of said second receiving means to receive the answer signals from the substations through said prescribed one of said second receiving means, said prescribed one of said second transmitting means being related in operation to said prescribed one of said second receiving means.

* * * * *

UNITED STATES PATENT AND TRADEMARK OFFICE
CERTIFICATE OF CORRECTION

PATENT NO. : 4,434,506
DATED : Feb. 28, 1984
INVENTOR(S) : Fujiwara et al

It is certified that error appears in the above-identified patent and that said Letters Patent is hereby corrected as shown below:

Column 3, line 14, after "and" delete "is";

Column 4, line 65, after "control" insert --signals--;

Column 5, line 23, after "first" change "perdetermined" to --predetermined--;

line 48, after "the" change "just" to --first--;

Column 8, line 40, after "down" insert --control--;

line 55, after "not" change "shoter" to --shorter--.

Signed and Sealed this

Twenty-second Day of May 1984

[SEAL]

Attest:

GERALD J. MOSSINGHOFF

Attesting Officer     Commissioner of Patents and Trademarks